US007630465B2

(12) United States Patent
Nieto

(10) Patent No.: US 7,630,465 B2
(45) Date of Patent: Dec. 8, 2009

(54) WIRELESS COMMUNICATIONS DEVICE PROVIDING TIME AND FREQUENCY-DOMAIN CHANNEL ESTIMATES INTERPOLATION AND RELATED METHODS

(75) Inventor: John Wesley Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 745 days.

(21) Appl. No.: 10/995,978

(22) Filed: Nov. 23, 2004

(65) Prior Publication Data

US 2006/0109919 A1 May 25, 2006

(51) Int. Cl.
*H04B 1/10* (2006.01)
(52) U.S. Cl. .................. 375/350; 375/260; 375/340; 375/346; 375/343; 375/316; 370/329; 370/500; 370/331; 370/210; 455/446; 455/434
(58) Field of Classification Search ................ 375/260, 375/316, 343, 340, 350, 346; 370/329, 500; 370/331, 210; 455/446, 434
See application file for complete search history.

(56) References Cited

U.S. PATENT DOCUMENTS

| 6,654,429 | B1 | 11/2003 | Li ........................ 375/316 |
| 2003/0026360 | A1* | 2/2003 | Ramasubramanian et al. .... 375/343 |
| 2005/0105647 | A1* | 5/2005 | Wilhelmsson et al. ....... 375/316 |
| 2005/0265490 | A1* | 12/2005 | Sestok et al. ................ 375/340 |

OTHER PUBLICATIONS

Coleri et al., Channel Estimation Techniques Based on Pilot Arrangement in OFDM Systems, IEEE Transactions on Broadcasting, vol. 48, No. 3, Sep. 2002.
Hutter et al., Channel Estimation for Mobile OFDM Systems, Institute for Integrated Circuits, Bridgelab Digital Signal Processing, Technical Institute of Munich.
Cheng et al., Time Versus Frequency Domain Channel Estimation for OFDM Systems with Antenna Arrays, Proc. of the 6th Int. Conf. on Signal Proc., vol. 2, pp. 1340-1343, Aug. 2002.
Coleri et al., Channel Estimation Techniques Based on Pilot Arrangement in OFDM Systems, IEEE Transactions on Broadcasting, vol. 48, No. 3, Sep. 2002.
Hutter et al., Channel Estimation for Mobile OFDM Systems, Institute for Integrated Circuits, Bridgelab Digital Signal Processing, Technical Institute of Munich, 1999.
Cheng et al., Time Versus Frequency Domain Channel Estimation for OFDM Systems with Antenna Arrays, Proc. of the 6th Int. Conf. on Signal Proc., vol. 2, pp. 1340-1343, Aug. 2002.

\* cited by examiner

*Primary Examiner*—Chieh M Fan
*Assistant Examiner*—Eva Y Puente
(74) *Attorney, Agent, or Firm*—Allen, Dyer, Doppelt, Milbrath & Gilchrist, P.A. Attorneys at Law

(57) ABSTRACT

A wireless communications device which may include a wireless receiver for receiving wireless signals comprising unknown data portions over a channel, and a demodulator connected to the wireless receiver. The demodulator may be for estimating a delay spread and a fade rate associated with the channel, determining a desired time-domain interpolation filter based upon the estimated fade rate, and determining a desired frequency-domain interpolation filter based upon the estimated delay spread. The demodulator may further generate channel estimates for the unknown data portions based upon the desired time-domain interpolation filter and the desired frequency-domain interpolation filter, and determine the unknown data portions based upon the channel estimates.

31 Claims, 3 Drawing Sheets

WIRELESS COMMUNICATIONS DEVICE PROVIDING TIME AND FREQUENCY-DOMAIN CHANNEL ESTIMATES INTERPOLATION AND RELATED METHODS

FIELD OF THE INVENTION

The present invention relates to the field of wireless communications systems, and, more particularly, to wireless multi-carrier communications systems and related methods.

BACKGROUND OF THE INVENTION

High frequency (HF) radio channels, very-high frequency (VHF) radio channels, and ultra-high frequency (UHF) radio channels all exhibit time and frequency dispersion (i.e., delay spread and Doppler spread) due to the presence of signal reflectors or scatterers in the environment, as well as the relative motion of transmitters and receivers. As a result, the channel experiences distortion which can cause transmitted symbols to be incorrectly interpreted at the receiving device. Doppler spreading can cause the delay spread (i.e. multipath) to vary with time. These phenomena typically require modems to employ equalization to track and compensate for the time-varying multipath channel.

For coherent demodulation of multi-carrier waveforms, such as orthogonal frequency division multiplexing (OFDM) waveforms, for example, pilot tones are inserted in the waveform. In the case of OFDM waveforms, the pilot tones are interspersed with the data being transmitted, and guard bands are positioned on either side of the data to separate one frame of data from the next. How many and how often to insert pilot tones in a waveform is usually decided based upon expected worst case multipath and fading conditions. Data in between pilot tones is interpolated to generate channel estimates for the data tones to allow demodulation. Such interpolation is usually based on expected worst case scenarios.

By way of example, U.S. Pat. No. 6,654,429 to Li discloses a method and apparatus for pilot-symbol aided channel estimation in a wireless digital communication system which transmits packets of N OFDM data blocks, where each data block includes a set of K orthogonal carrier frequencies. At the transmitter, pilot symbols are inserted into each data packet at known positions to occupy predetermined positions in the time-frequency space. At the receiver, the received signal is subject to a two-dimensional inverse Fourier transform, two-dimensional filtering and a two-dimensional Fourier transform to recover the pilot symbols so as to estimate the channel response.

In an article entitled "Time versus Frequency Domain Channel Estimation for OFDM Systems with Antenna Arrays," Cheng et al. compare channel estimation schemes in the time and frequency domains in terms of error performance of both the estimated channel impulse response (CIR) and transfer function (TF) as well as the resulting bit-error rate (BER) in an orthogonal frequency-division multiplexing (OFDM) system with a time-multiplexed preamble. Cheng et al. determined that if a total number of sub-carriers K exceeded a number of taps L in the CIR, the TF estimate based on the time domain least squares (LS) scheme was more accurate than the one obtained from direct LS estimation in the frequency domain.

Despite such approaches, improved techniques for performing channel estimate interpolation for demodulating multi-carrier waveforms are still desirable in many applications.

SUMMARY OF THE INVENTION

In view of the foregoing background, it is therefore an object of the present invention to provide a wireless communications device providing improved channel estimation and related methods.

This and other objects, features, and advantages in accordance with the present invention are provided by a wireless communications device which may include a wireless receiver for receiving wireless signals comprising unknown data portions over a channel, and a demodulator connected to the wireless receiver. The demodulator may be for estimating a delay spread and a fade rate associated with the channel, determining a desired time-domain interpolation filter based upon the estimated fade rate, and determining a desired frequency-domain interpolation filter based upon the estimated delay spread. The demodulator may further generate channel estimates for the unknown data portions based upon the desired time-domain interpolation filter and the desired frequency-domain interpolation filter, and determine the unknown data portions based upon the channel estimates.

More particularly, the wireless signals may include guard bands separating the unknown data portions, and the demodulator may estimate the delay spread and/or the fade rate based upon the guard bands. Moreover, the wireless signals may also include a plurality of pilot symbols, and the demodulator may estimate the delay spread and/or the fade rate based upon the pilot tones. In some embodiments, both the delay spread and the fade rate may be determined based upon the guard bands and the pilot symbols.

The demodulator may generate the channel estimates based upon an average of the time-domain and frequency-domain interpolations. By way of example, the average may be a weighted average. The desired time-domain interpolation filter may be determined from a plurality of predetermined time-domain interpolation filters each associated with a different fade rate. Similarly, the desired frequency-domain interpolation filter may be determined from a plurality of predetermined frequency-domain interpolation filters each associated with a different delay spread. Furthermore, the wireless signals may be orthogonal frequency division multiplexing (OFDM) signals, for example.

A wireless communications method aspect of the invention may include receiving wireless signals comprising unknown data portions over a channel, estimating a delay spread and a fade rate associated with the channel, determining a desired time-domain interpolation filter based upon the estimated fade rate, and determining a desired frequency-domain interpolation filter based upon the estimated delay spread. The method may further include generating channel estimates for the unknown data portions based upon the desired time-domain interpolation filter and the desired frequency-domain interpolation filter, and determining the unknown data portions based upon the channel estimates.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
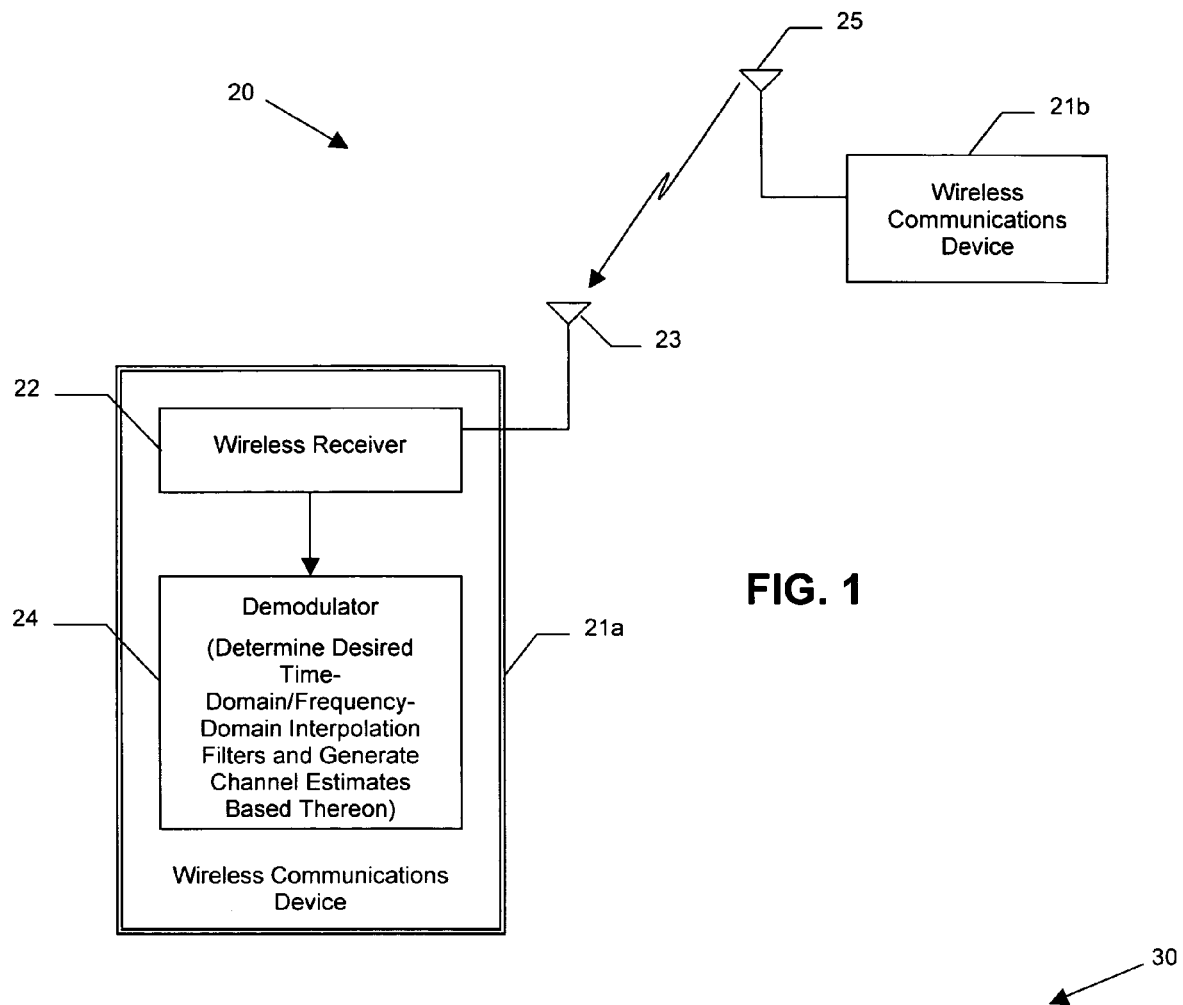
FIG. 1 is schematic block diagram of a wireless communications device in accordance with the present invention.

Referring initially to FIG. 1, a wireless communications system 20 illustratively including a plurality of wireless communications devices 21a, 21b in accordance with the present invention is first described. The wireless communications devices 21a, 21b are particularly well-suited for use with multi-carrier waveforms, such as OFDM waveforms, for example. By way of example, the wireless communications system 20 may be any wireless local area network (WLAN), cellular telephone network, mobile ad-hoc network (MANET), etc., in which multi-carrier waveforms are used, as will be appreciated by those skilled in the art.

In the illustrated embodiment, the wireless communications device 21b illustratively transmits wireless signals via an antenna 25 to the device 21a. The device 21a illustratively includes a wireless receiver 22 and associated antenna 23 for receiving the wireless signals from the device 21b. Furthermore, the device 21a also illustratively includes a demodulator 24 connected to the wireless receiver 22 for demodulating the wireless multi-carrier signals, as will be discussed further below. It should be noted that while only the device 21a illustratively includes the wireless receiver 22 and demodulator 24 for clarity of illustration, these components may be included in the device 21b as well.

Figure 3:
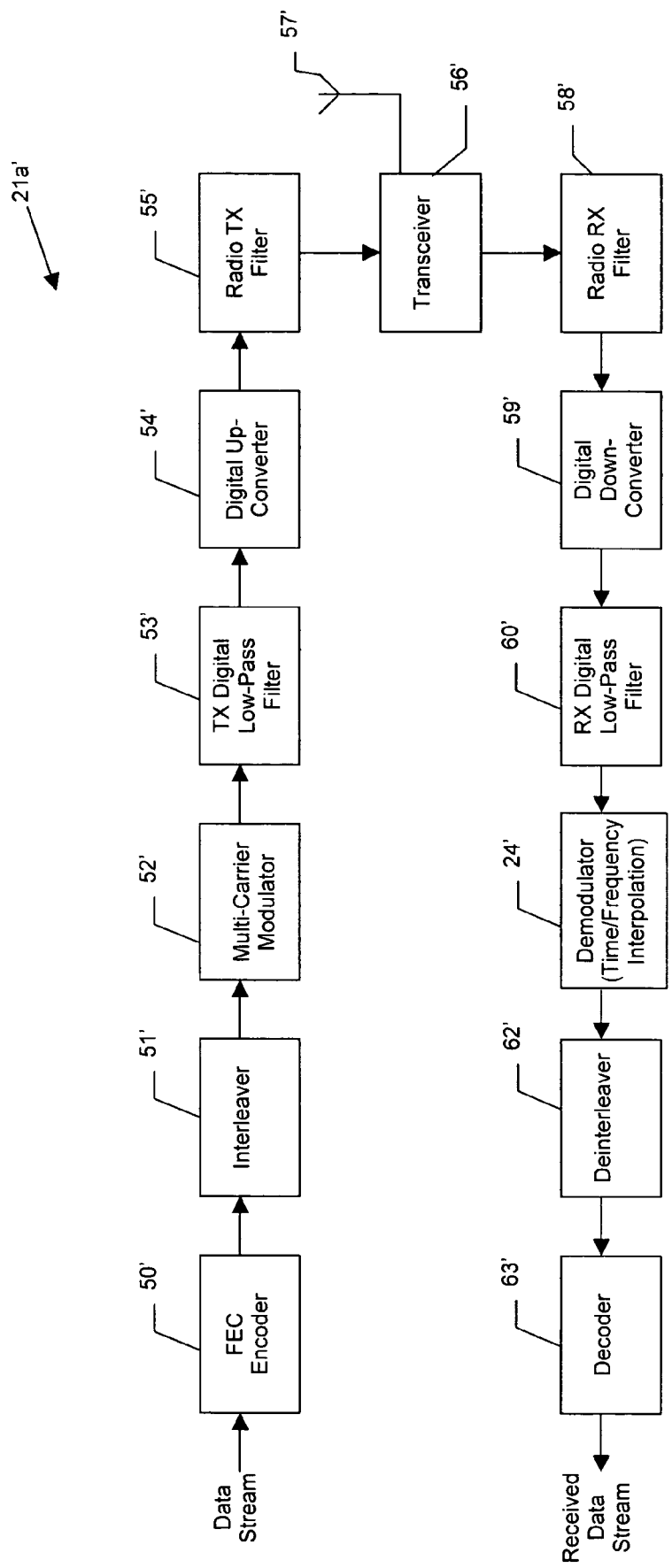
FIG. 3 is schematic block diagram of an embodiment of a wireless communications device of FIG. 1 including both transmission and reception circuitry.

More particularly, in many embodiments the devices 21a, 21b will advantageously include both transmit and receive circuitry, an exemplary implementation of which is now described with reference to FIG. 3. The transmit circuitry illustratively includes a forward error correction (FEC) encoder 50' which receives a data stream to be transmitted, an interleaver 51' downstream from the encoder, a multi-carrier modulator 52' downstream from the interleaver, and a transmit (TX) digital low-pass filter 53' is downstream from the multi-carrier modulator, as will be appreciated by those skilled in the art. Moreover, a digital up-converter 54' is downstream from the transmit digital low-pass filter 53', a radio transmit filter 55' is downstream from the digital up-converter, and a transceiver 56' is downstream from the radio transmit filter for transmitting signals via an associated antenna 57', as will also be appreciated by those skilled in the art.

The wireless communications device 21a' may further include additional receiver components illustratively including a radio receive (RX) filter 58' downstream from the transceiver 56', a digital down converter 59' downstream from the radio receive filter, and a receive digital low-pass filter 60' downstream from the digital down converter. The demodulator 24' is downstream from the receive digital low-pass filter 60', and it is followed by a deinterleaver 62' and then a decoder 63', which reproduces a received data stream. By way of example, one or more of the above-noted transmit or receive components may be implemented in a field-programmable gate array (FPGA) and/or application specific integrated circuit (ASIC). In some embodiments, these components may also be implemented as software modules with a digital signal processor (DSP) as well, for example, as will be appreciated by those skilled in the art.

Figure 2:
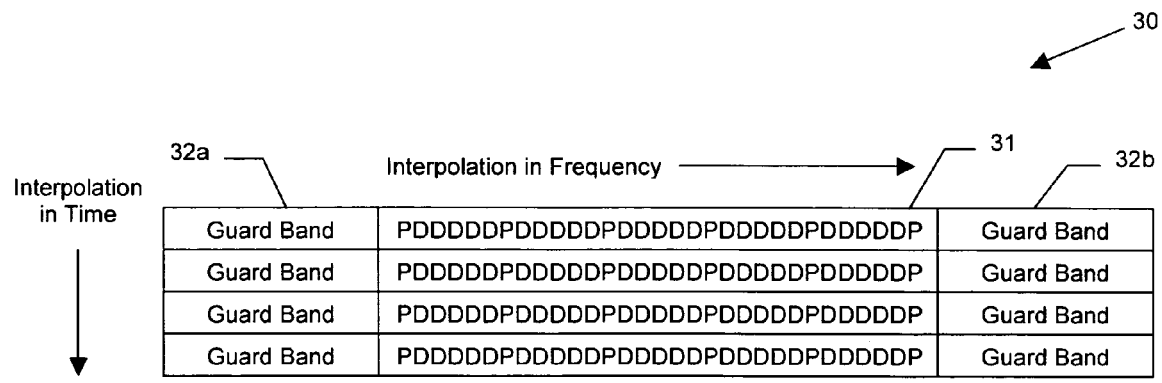
FIG. 2 is a schematic block diagram of signal waveforms including data portions with interspersed pilot symbols and guard bands illustrating time and frequency-domain interpolation in accordance with the present invention.

The demodulation operations performed by the demodulator 24 will be described below with reference to the exemplary multi-carrier signal waveforms 30 illustrated in FIG. 2. The signals 30 illustratively include a plurality of data portions 31 each including unknown data D. Pilot symbols (or tones) P are interspersed with the data D in the data portions 31. As noted above, the amount and location of the pilot symbols P may be determined based upon the expected worst case multipath and fading conditions present in a given application, for example. Furthermore, guard bands 32a, 32b demarcate the data portions 31 from one another to define frames, as will be appreciated by those skilled in the art. It should be noted that while shown schematically in FIG. 2 for clarity of illustration, the guard bands 32a, 32b are in the time domain (i.e., they are "guard times"), and the pilot tones are in the frequency domain, as will be appreciated by those skill in the art.

The receiver 22 receives wireless signals 30 comprising the unknown data portions over a channel. The demodulator 24 estimates a delay spread and a fade rate associated with the channel. This is done by combining guard-band 32a, 32b correlations and pilot symbol P channel estimates. More particularly, since the guard bands 32a, 32b are repeated at the beginning and end of each data section 31, a rotation of the guard band over several samples may be observed and used along with the pilot symbols P for determining the delay spread and the fade rate, as will be appreciated by those skilled in the art.

Once the fade rate and delay spread associated with the channel have been estimated, the demodulator 24 determines a desired time-domain interpolation based upon the estimated fade rate, and it also determines a desired frequency-domain interpolation filter based upon the estimated delay spread. The demodulator 24 thus advantageously arrives at an interpolation scheme which best fits the current channel conditions in time and frequency. More particularly, having an estimate of the current fade rate allows the appropriate selection of interpolation filters between multi-carrier frames, as shown in FIG. 2. Further, having a delay spread estimate for the current multi-carrier frame provides an approximation of the shape the frequency-domain should have, and thus an interpolation filter in the frequency domain may be selected which best fits this expected shape.

More specifically, values for a plurality of time-domain and frequency-domain interpolation filters may be generated ahead of time and stored in a look-up table for comparison with the estimated fade rate and delay spread. By way of example, to determine a best-fitting frequency domain interpolation filter, the demodulator 24 may perform a fast Fourier transform (FFT) on the estimated delay spread, and then determine a best fit based upon the look-up table, as will be appreciated by those skilled in the art. It will also be appreciated that the interpolation filters may be generated "on the fly" as well, if sufficient processing resources were available in view of the particular system bandwidth. However, in many wideband applications, a look-up table may be more practical.

The demodulator 24 generates channel estimates for the unknown data portions D based upon the selected time-domain and frequency-domain interpolation filters, and determines the unknown data portions based upon the channel estimates. As noted above, the demodulator 24 may apply the frequency-domain interpolation filter across a current multi-carrier frame, while the time-domain interpolation may be applied across multiple frames, as seen in FIG. 2. Many different approaches may be used based upon the given overhead and performance characteristics of a particular system. Generally speaking, interpolation across time may be performed first and then interpolation across frequency, although this order may be reversed or a combined interpolation operation may also be performed, as will be appreciated by those skilled in the art.

Moreover, the demodulator 24 may generate the channel estimates based upon an average or weighted average of the time-domain and frequency-domain interpolations of the channel estimates. For example, if the delay spread and fade rate indicate an additive white Gaussian noise (AWGN) channel, then the channel estimate may be the average of all adjacent pilot tones in time and frequency. If there is a predetermined delay spread, an interpolation scheme may be used which shapes the channel estimate more heavily based upon the frequency interpolation. If there is a predetermined fade rate, an interpolation scheme may be used which shapes the channel estimate more heavily based upon the time-domain interpolation, as will also be appreciated by those skilled in the art.

Figure 4:
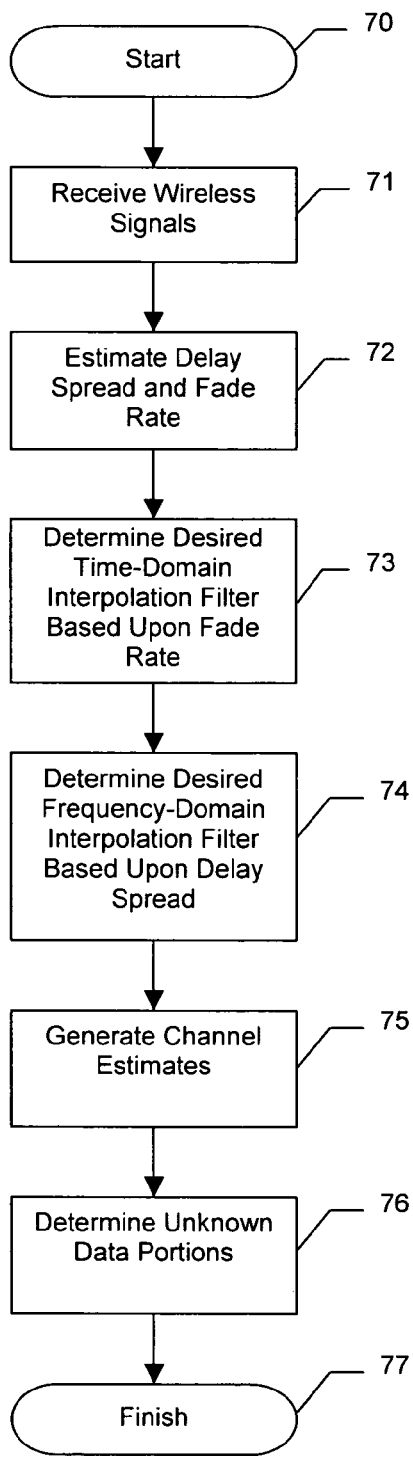
FIGS. 4 and 5 are flow diagrams illustrating wireless communications method aspects of the present invention.
Figure 5:
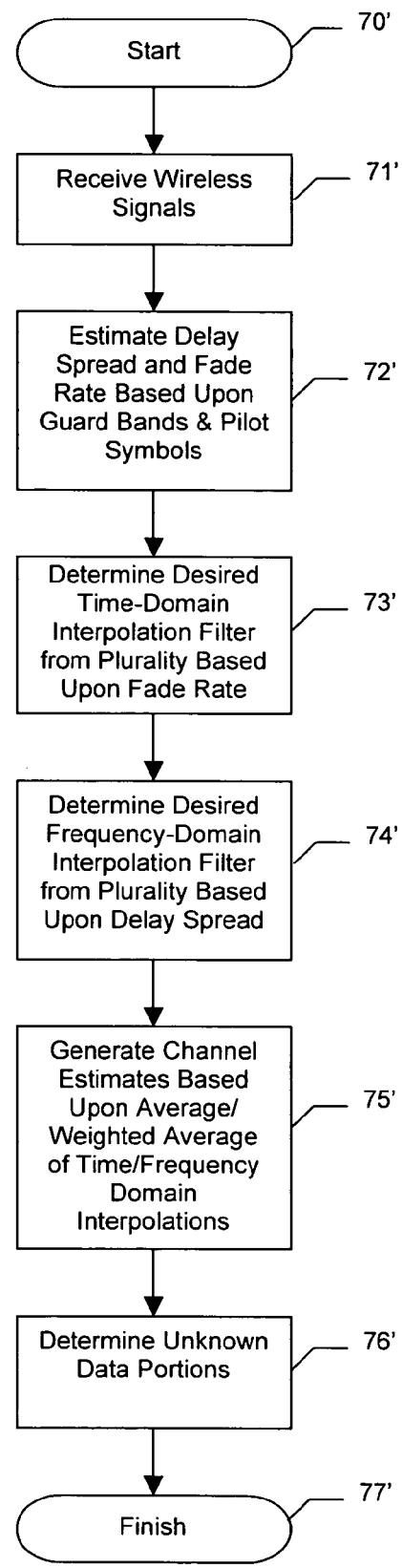

Turning now additionally to FIGS. 4 and 5, wireless communications method aspects of the invention are now described. Beginning at Block 70, the method begins with receiving wireless signals 30 including unknown data portions over a channel, at Block 71, and estimating a delay spread and a fade rate associated with the channel, at Block 72. As noted above, this may be done based upon the guard bands and pilot symbols in the wireless signals (Block 71'). The method further illustratively includes selecting a desired time-domain interpolation filter based upon the estimated fade rate, at Block 73, and selecting a desired frequency-domain interpolation filter based upon the estimated delay spread, at Block 74. Here again, the desired time-domain and frequency-domain interpolation filters may be selected from a plurality of filters stored in a look-up table, for example (Blocks 73', 74').

The method further illustratively includes generating channel estimates for the unknown data portions, at Block 75, based upon the desired time-domain interpolation filter and the desired frequency-domain interpolation filter. As noted above, this may be done based upon an average or weighted average of the time and frequency-domain interpolations, for example, at Block 75'. The unknown data portions are then determined based upon the time and frequency-domain interpolations, at Block 76, thus concluding the illustrated method (Block 77).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A wireless communications device comprising:
   a wireless receiver for receiving wireless signals comprising unknown data portions over a channel, the wireless signals comprising guard bands separating the unknown data portions; and
   a demodulator connected to said wireless receiver for
   estimating a delay spread and a fade rate associated with the channel based upon the guard bands,
   determining a desired time-domain interpolation filter from a plurality of predetermined time-domain interpolation filters each associated with a different fade rate based upon the estimated fade rate,
   determining a desired frequency-domain interpolation filter based upon the estimated delay spread,
   generating channel estimates for the unknown data portions based upon the desired time-domain interpolation filter and the desired frequency-domain interpolation filter, and
   determining the unknown data portions based upon the channel estimates.

2. The wireless communications device of claim 1 wherein the wireless signals further comprise a plurality of pilot symbols interspersed with data in the unknown data portions, and wherein said demodulator estimates the delay spread based upon the pilot symbols.

3. The wireless communications device of claim 1 wherein the wireless signals further comprise a plurality of pilot symbols interspersed with data in the unknown data portions, and wherein said demodulator further estimates the fade rate based upon the pilot symbols.

4. The wireless communications device of claim 1 wherein said demodulator generates the channel estimates based upon an average of the time-domain and frequency-domain interpolations of the channel estimates.

5. The wireless communications device of claim 1 wherein said demodulator generates the channel estimates based upon a weighted average of the time-domain and frequency-domain interpolations of the channel estimates.

6. The wireless communications device of claim 1 wherein said demodulator determines the desired frequency-domain interpolation filter from a plurality of predetermined frequency-domain interpolation filters each associated with a different delay spread.

7. The wireless communications device of claim 1 wherein the wireless signals comprise orthogonal frequency division multiplexing (OFDM) signals.

8. A wireless communications device comprising:
   a wireless receiver for receiving wireless signals over a channel, the wireless signals comprising unknown data portions, a plurality of pilot symbols interspersed with unknown data in the unknown data portions, and guard bands separating the unknown data portions; and
   a demodulator connected to said wireless receiver for
   estimating a delay spread and a fade rate associated with the channel based upon the pilot symbols and the guard bands,
   determining a desired time-domain interpolation filter from a plurality of predetermined time-domain interpolation filters each associated with a different fade rate based upon the estimated fade rate,
   determining a desired frequency-domain interpolation filter based upon the estimated delay spread,
   generating channel estimates for the unknown data portions based upon the desired time-domain interpolation filter and the desired frequency-domain interpolation filter, and
   determining the unknown data portions based upon the channel estimates.

9. The wireless communications device of claim 8 wherein said demodulator generates the channel estimates based upon an average of the time-domain and frequency-domain interpolations of the channel estimates.

10. The wireless communications device of claim 8 wherein said demodulator generates the channel estimates based upon a weighted average of the time-domain and frequency-domain interpolations of the channel estimates.

11. The wireless communications device of claim 8 wherein said demodulator determines the desired frequency-domain interpolation filter from a plurality of predetermined frequency-domain interpolation filters each associated with a different delay spread.

12. The wireless communications device of claim 8 wherein the wireless signals comprise orthogonal frequency division multiplexing (OFDM) signals.

13. A wireless communications system comprising:
a plurality of wireless communications devices each comprising
a wireless receiver for receiving wireless signals comprising unknown data portions over a channel, the wireless signals comprising guard bands separating the unknown data portions; and
a demodulator connected to said wireless receiver for
estimating a delay spread and a fade rate associated with the channel based upon the guard bands,
determining a desired time-domain interpolation filter based upon the estimated fade rate,
determining a desired frequency-domain interpolation filter from a plurality of predetermined frequency-domain interpolation filters each associated with a different delay spread based upon the estimated delay spread,
generating channel estimates for the unknown data portions based upon the desired time-domain interpolation filter and the desired frequency-domain interpolation filter, and
determining the unknown data portions based upon the channel estimates.

14. The wireless communications system of claim 13 wherein the wireless signals further comprise a plurality of pilot symbols interspersed with data in the unknown data portions, and wherein said demodulator further estimates at least one of the delay spread and the fade rate based upon the pilot symbols.

15. The wireless communications system of claim 13 wherein said demodulator generates the channel estimates based upon an average of the time-domain and frequency-domain interpolations of the channel estimates.

16. The wireless communications system of claim 15 wherein said demodulator generates the channel estimates based upon a weighted average of the time-domain and frequency-domain interpolations of the channel estimates.

17. The wireless communications system of claim 13 wherein said demodulator determines the desired time-domain interpolation filter from a plurality of predetermined time-domain interpolation filters each associated with a different fade rate.

18. The wireless communications system of claim 13 wherein the wireless signals comprise orthogonal frequency division multiplexing (OFDM) signals.

19. A wireless communications method comprising:
receiving wireless signals comprising unknown data portions over a channel, the wireless signals comprising guard bands separating the unknown data portions;
estimating a delay spread and a fade rate associated with the channel based upon the guard bands;
determining a desired time-domain interpolation filter from a plurality of predetermined time-domain interpolation filters each associated with a different fade rate based upon the estimated fade rate;
determining a desired frequency-domain interpolation filter based upon the estimated delay spread;
generating channel estimates for the unknown data portions based upon the desired time-domain interpolation filter and the desired frequency-domain interpolation filter; and
determining the unknown data portions based upon the channel estimates.

20. The method of claim 19 wherein the wireless signals further comprise a plurality of pilot symbols interspersed with data in the unknown data portions, and wherein estimating further comprises estimating at least one of the delay spread and the fade rate based upon the pilot symbols.

21. The method of claim 19 wherein generating the channel estimates comprises, generating the channel estimates based upon an average of the time-domain and frequency-domain interpolations of the channel estimates.

22. The method of claim 21 wherein generating the channel estimates comprises generating the channel estimates based upon a weighted average of the time-domain and frequency-domain interpolations of the channel estimates.

23. The method of claim 19 wherein determining the desired frequency-domain interpolation filter comprises determining the desired frequency-domain interpolation filter from a plurality of predetermined frequency-domain interpolation filters each associated with a different delay spread.

24. The method of claim 19 wherein the wireless signals comprise orthogonal frequency division multiplexing (OFDM) signals.

25. A wireless communications device comprising:
a wireless receiver for receiving wireless signals comprising unknown data portions over a channel, the wireless signals comprising guard bands separating the unknown data portions; and
a demodulator connected to said wireless receiver for
estimating a delay spread and a fade rate associated with the channel based upon the guard bands,
determining a desired time-domain interpolation filter based upon the estimated fade rate,
determining a desired frequency-domain interpolation filter from a plurality of predetermined frequency-domain interpolation filters each associated with a different delay spread based upon the estimated delay spread,
generating channel estimates for the unknown data portions based upon the desired time-domain interpolation filter and the desired frequency-domain interpolation filter, and
determining the unknown data portions based upon the channel estimates.

26. The wireless communications device of claim 25 wherein the wireless signals further comprise a plurality of pilot symbols interspersed with data in the unknown data portions, and wherein said demodulator further estimates the delay spread based upon the pilot symbols.

27. The wireless communications device of claim 25 wherein the wireless signals further comprise a plurality of pilot symbols interspersed with data in the unknown data portions, and wherein said demodulator estimates the fade rate based upon the pilot symbols.

28. A wireless communications method comprising:
receiving wireless signals comprising unknown data portions over a channel, the wireless signals comprising guard bands separating the unknown data portions;
estimating a delay spread and a fade rate associated with the channel based upon the guard bands;

determining a desired time-domain interpolation filter based upon the estimated fade rate;

determining a desired frequency-domain interpolation filter from a plurality of predetermined frequency-domain interpolation filters each associated with a different delay spread based upon the estimated delay spread;

generating channel estimates for the unknown data portions based upon the desired time-domain interpolation filter and the desired frequency-domain interpolation filter; and determining the unknown data portions based upon the channel estimates.

29. The method of claim 28 wherein the wireless signals further comprise a plurality of pilot symbols interspersed with data in the unknown data portions, and wherein estimating further comprises estimating at least one of the delay spread and the fade rate based upon the pilot symbols.

30. The method of claim 28 wherein generating the channel estimates comprises generating the channel estimates based upon an average of the time-domain and frequency-domain interpolations of the channel estimates.

31. The method of claim 28 wherein generating the channel estimates comprises generating the channel estimates based upon a weighted average of the time-domain and frequency-domain interpolations of the channel estimates.

* * * * *